United States Patent
Vardi

(10) Patent No.: US 12,499,610 B2
(45) Date of Patent: Dec. 16, 2025

(54) METHODS AND SYSTEMS FOR SIMULATING IMAGE CAPTURE OF IMAGING DEVICE

(71) Applicant: RAFAEL ADVANCED DEFENSE SYSTEMS LTD., Haifa (IL)

(72) Inventor: Yair Vardi, Rosh HaNikra (IL)

(73) Assignee: RAFAEL ADVANCED DEFENSE SYSTEMS LTD., Haifa (IL)

(*) Notice: Subject to any disclaimer, the term of this patent is extended or adjusted under 35 U.S.C. 154(b) by 152 days.

(21) Appl. No.: 18/562,395

(22) PCT Filed: May 29, 2022

(86) PCT No.: PCT/IB2022/055042
§ 371 (c)(1),
(2) Date: Nov. 20, 2023

(87) PCT Pub. No.: WO2023/012529
PCT Pub. Date: Feb. 9, 2023

(65) Prior Publication Data
US 2025/0014262 A1     Jan. 9, 2025

(30) Foreign Application Priority Data

Aug. 2, 2021 (IL) .......................................... 285320

(51) Int. Cl.
*G06T 15/20* (2011.01)
*G06T 3/40* (2024.01)
*G06T 5/70* (2024.01)

(52) U.S. Cl.
CPC ............... *G06T 15/20* (2013.01); *G06T 3/40* (2013.01); *G06T 5/70* (2024.01); *G06T 2207/20221* (2013.01)

(58) Field of Classification Search
CPC .. G06T 15/20; G06T 3/40; G06T 5/70; G06T 2207/20221; G06T 5/50; G06T 15/506; G06T 7/00; G06T 2200/00; G06T 2200/21; G06T 2200/28
See application file for complete search history.

(56) References Cited

U.S. PATENT DOCUMENTS

| | | | |
|---|---|---|---|
| 8,503,828 B2* | 8/2013 | Kondo | G06T 3/4053 348/208.4 |
| 11,276,177 B1* | 3/2022 | Tsai | G06T 7/174 |
| 2019/0026864 A1* | 1/2019 | Chen | G06T 3/4053 |
| 2023/0005108 A1* | 1/2023 | Gopalkrishna | H04N 5/2723 |

* cited by examiner

*Primary Examiner* — Said Broome
*Assistant Examiner* — Jordan Wan Yick
(74) *Attorney, Agent, or Firm* — Rivka Friedman

(57) ABSTRACT

Methods, systems, and computer program products simulate image-capture of a scene at having least one object of interest (OOI) by a camera. A plurality of rendered images is obtained and includes: i) a first image, at a first resolution, that is an image of the scene and excludes the OOI, ii) a second image, at a second resolution higher than the first resolution, that is an image of the OOI, iii) a third image, at the second resolution, that is an image of a region that bounds the OOI, wherein the OOI at least partially affects one or more other objects in the region, and iv) a fourth image, at the second resolution, wherein for each pixel of the fourth image, a pixel value of the pixel indicates a contribution of the OOI in the pixel. The images are processed to produce a high-resolution image of the OOI.

21 Claims, 6 Drawing Sheets

METHODS AND SYSTEMS FOR SIMULATING IMAGE CAPTURE OF IMAGING DEVICE

TECHNICAL FIELD

The present invention relates to graphics processing, and more specifically rendering objects of interest at particular resolution for simulation purposes.

BACKGROUND OF THE INVENTION

Computer graphics relates to rendering images using computing devices that perform various graphics processing techniques. Graphics processing techniques and architectures are well known, and have become more advanced as a result of market demand for computer games (i.e., "video games") as well as the improvement of computer hardware that performs the image rendering processes. Graphics processing methods for handling objects having three-dimensional (3D) geometry generally fall into two main categories: 1) image rendering via ray tracing in which the path of light is traced as pixels in an image plane and the effects of encounters of the traced light with virtual objects is simulated, and 2) image rendering via projecting 3D object geometries on a two-dimensional (2D) image plane. The 3D to 2D projection method is generally faster and more efficient than ray tracing, and is therefore often preferable to ray tracing. The 3D to 2D projection method typically first breaks the geometry of a 3D scene and the objects therein into polygons (often triangles), lays those polygons onto a 2D image plane, checks for each pixel center in the image plane whether a polygon is imposed on that pixel, and then colors the pixel accordingly.

A schematic representation of a graphics rendering pipeline 12 that performs this 3D to 2D image rendering is illustrated in FIG. 1. The output of one stage of the pipeline is fed as input to the next stage of the pipeline. Four stages are illustrated in FIG. 1, but each stage typically includes one or more sub-stages. The vertex processing stage 14 takes as input raw vertices and primitives, and processes this input to generate transformed vertices and primitives as output. A vertex is made up of attributes, such as position (e.g., in (x, y, z) cartesian coordinates), color, normal vector of the vertex, and texture. A primitive is made up of one or more vertices, typically in the form of polygons (e.g., triangles). The transformed vertices and primitives are fed as input to the rasterization stage 16, which rasterizes (raster-scans) each primitive (connected vertices) to convert the primitive into a set of grid-aligned fragments (for example by interpolating vertices). Here, each fragment can be interpreted as a pixel having attributes such as those mentioned above (e.g., position, color, normal, texture). The individual grid-aligned fragments are fed as input to the fragment processing stage 18, which processes the individual fragment by performing fragment shading, including texturing and lighting (per fragment). The processed fragments are then fed as input to the output merging stage 20 which combines all of the primitives (which are in 3D space) into 2D color-pixels (i.e., a 2D array of color-values).

The processing steps described above are particularly suitable in the context of graphics processing for display output (i.e., outputting of the 2D color-pixels for display via a display device), such as, for example, in video game or computer animation applications, in which a single discrete sample (at the center of each pixel) is used in order to render the pixel. However, such processing steps are not sufficient for simulating image capture of a real-world scene by an image capture device (i.e., camera), which requires high physical accuracy to mimic the real-world camera system.

SUMMARY OF THE INVENTION

The present invention is a method and system for simulating images captured by an imaging device.

The disclosed method and system provide high accuracy of an object or objects of interest in a rendered image by employing a rendering solution which utilizes high-sampling (high-resolution) to render the objects of interest, while maintaining low-sampling (lower-resolution) to render background and objects that are not the object of interest. The embodiments of the present disclosure have significant advantages over conventional rendering solutions, in particular solutions that are used for video game or computer animation applications, in which entire objects may not be sampled at all and/or object boundaries may flicker over time (as a result of aliasing and/or sharp contrast or texture). In addition, since an object of interest generally occupies a low percentage of total area of an image, the embodiments of the present disclosure also have significant advantages over naïve solutions in which individual pixels of an entire image are sampled at a higher density by providing a rendering solution that consumes comparatively fewer computing and processing resources than such naïve solutions.

According to the teachings of an embodiment of the present invention, there is provided a method for simulating image-capture of a scene by a camera, the scene containing at least one object of interest (OOI). The method comprises: a) obtaining a plurality of images each having an associated resolution, the plurality of images including: i) a first image, at a first resolution, that is an image of the scene and excludes the OOI, ii) a second image, at a second resolution higher than the first resolution, that is an image of the OOI, iii) a third image, at the second resolution, that is an image of a region that bounds the OOI, the OOI at least partially affects one or more other objects in the region, and iv) a fourth image, at the second resolution, for each pixel of the fourth image, a pixel value of the pixel indicates a contribution of the OOI in the pixel; b) multiplying together the second image and the fourth image to produce a product image; c) reducing the resolution of the product image to the first resolution to produce a reduced resolution product image; d) reducing the resolution of each of the third image and the fourth image to the first resolution to produce a reduced resolution third image and a reduced resolution fourth image; and e) combining together the reduced resolution product image and an intermediate image to produce an output image, the intermediate image being a weighted combination of the first image and the reduced resolution third image produced using weights based on the reduced resolution fourth image.

Optionally, reducing the resolution of the product image to the first resolution includes: downsampling and blurring the product image to produce a blurred-downsampled image at an interim resolution, and downsampling the blurred-downsampled image to the first resolution.

Optionally, the intermediate image is produced by: i) applying weights based on the reduced resolution fourth image to the first image to produce a weighted version of the first image, ii) applying weights based on the reduced resolution fourth image to the reduced resolution third image to produce a weighted version of the reduced resolution third image, and iii) adding together the weighted version first image and the weighted version of the reduced resolution third image to produce the weighted image.

Optionally, combining together the reduced resolution product image and the weighted image includes: adding the reduced resolution product image to the weighted image to produce the output image.

Optionally, the fourth image is generated based at least in part on each of the second image and the third image.

Optionally, the region includes one or more other objects in addition to the OOI.

Optionally, the second image excludes all of the one or more other objects.

Optionally, the second resolution is received as input from a user.

Optionally, the method is implemented on at least one processor using a graphics processing pipeline.

Optionally, the scene includes a plurality of OOIs, and a) through e) are performed for each of the OOIs.

There is also provided according to the teachings of an embodiment of the present invention, a system for simulating image-capture of a scene by a camera, the scene containing at least one object of interest (OOI). The system comprises: a) a processing unit including at least one processor in communication with at least one storage medium configured to: i) obtain a plurality of images each having an associated resolution, the plurality of images including: 1) a first image, at a first resolution, that is an image of the scene and excludes the OOI, 2) a second image, at a second resolution higher than the first resolution, that is an image of the OOI, 3) a third image, at the second resolution, that is an image of a region that bounds the OOI, the OOI at least partially affects one or more other objects in the region, and 4) a fourth image, at the second resolution, for each pixel of the fourth image, a pixel value of the pixel indicates a contribution of the OOI in the pixel, ii) multiply together the second image and the fourth image to produce a product image, iii) reduce the resolution of the product image to the first resolution to produce a reduced resolution product image, iv) reduce the resolution of each of the third image and the fourth image to the first resolution to produce a reduced resolution third image and a reduced resolution fourth image, and v) combine together the reduced resolution product image and an intermediate image to produce an output image, the intermediate image being a weighted combination of the first image and the reduced resolution third image produced using weights based on the reduced resolution fourth image.

Optionally, the processing unit is configured to reduce the resolution of the product image to the first resolution by downsampling and blurring the product image to produce a blurred-downsampled image at an interim resolution, and downsampling the blurred-downsampled image to the first resolution.

Optionally, the processing unit is configured to produce the intermediate image by: i) applying weights based on the reduced resolution fourth image to the first image to produce a weighted version of the first image, ii) applying weights based on the reduced resolution fourth image to the reduced resolution third image to produce a weighted version of the reduced resolution third image, and iii) adding together the weighted version first image and the weighted version of the reduced resolution third image to produce the weighted image.

Optionally, the processing unit is configured to combine together the reduced resolution product image and the weighted image by: adding the reduced resolution product image to the weighted image to produce the output image.

Optionally, the processing unit is further configured to generate the fourth image based at least in part on each of the second image and the third image.

Optionally, the region includes one or more other objects in addition to the OOI.

Optionally, the second image excludes all of the one or more other objects.

Optionally, the processing unit is further configured to receive the second resolution as input from a user.

Optionally, the system further comprises: b) an input interface in communication with the processing unit for providing at least the second resolution as input to the processing unit; and c) an output interface in communication with the processing unit for providing at least the output image as output from the system.

Optionally, the processing unit is configured as a graphical processing unit that implements a graphics processing pipeline.

There is also provided according to the teachings of an embodiment of the present invention, a computer usable non-transitory storage medium having a computer program embodied thereon for causing a suitably programmed system to produce an image thereby simulating image-capture of a scene by a camera, the scene containing at least one object of interest (OOI), by performing the following steps when such program is executed on the system. The steps comprise: a) obtaining a plurality of images each having an associated resolution, the plurality of images including: i) a first image, at a first resolution, that is an image of the scene and excludes the OOI, ii) a second image, at a second resolution higher than the first resolution, that is an image of the OOI, iii) a third image, at the second resolution, that is an image of a region that bounds the OOI, the OOI at least partially affects one or more other objects in the region, and iv) a fourth image, at the second resolution, for each pixel of the fourth image, a pixel value of the pixel indicates a contribution of the OOI in the pixel; b) multiplying together the second image and the fourth image to produce a product image; c) reducing the resolution of the product image to the first resolution to produce a reduced resolution product image; d) reducing the resolution of each of the third image and the fourth image to the first resolution to produce a reduced resolution third image and a reduced resolution fourth image; and e) combining together the reduced resolution product image and an intermediate image to produce an output image, the intermediate image being a weighted combination of the first image and the reduced resolution third image produced using weights based on the reduced resolution fourth image.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

The present invention is a method and system for simulating image capture by an imaging device.

The principles and operation of the method and system according to present invention may be better understood with reference to the drawings accompanying the description.

Figure 1:
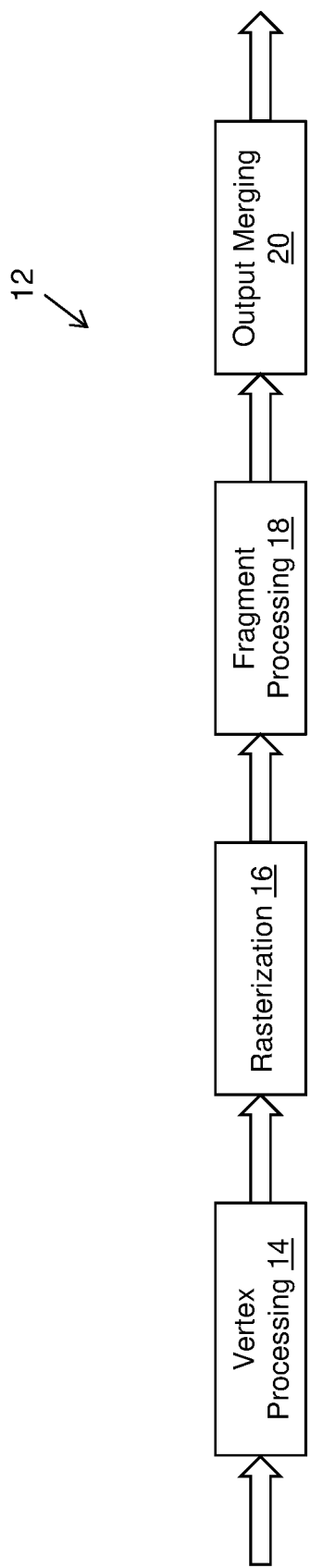
FIG. 1 is a schematic representation, described above, of a graphics pipeline that performs image rendering of objects having three-dimensional (3D) geometry on a two-dimensional (2D) image plane.

Preferred embodiments of the present invention leverage the processing capabilities of a graphics rendering pipeline (also referred to herein as a "graphics processing pipeline" or simply "pipeline") that performs a 3D to 2D projection/projecting method, such as the pipeline 12 illustrated in FIG. 1, and augment the processing performed in the pipeline stages in order to render images of scenes, that contain one or more objects of interest at enhanced resolution relative to all other objects, which mimic or simulate a real-world image captured by an imaging device (i.e., a camera).

Embodiments of the present disclosure are of particular value when used within the context of developing and testing electro-optical (E/O) systems such as imaging devices. One advantage provided by the embodiments of the present disclosure is the ability to simulate various alternatives in the E/O system design enabling evaluation of advantages and disadvantages of such alternatives. Another advantage provided by the embodiments of the present disclosure is the ability to reliably simulate the performance of imaging systems/devices, including the performance of image processing algorithms performed by such systems/devices. This may be particularly advantageous in the development of computer vision algorithms in which various imaging scenarios (weather conditions, environmental conditions, lighting conditions, etc.) a large number of input test vectors are typically required for developing robust algorithms.

The above-mentioned advantages are only representative of some of advantages provided by the embodiments of the present disclosure, and are not intended to be exhaustive. Other advantages may be presented in subsequent sections of the present disclosure, and may become apparent to those skilled in the art.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 2:
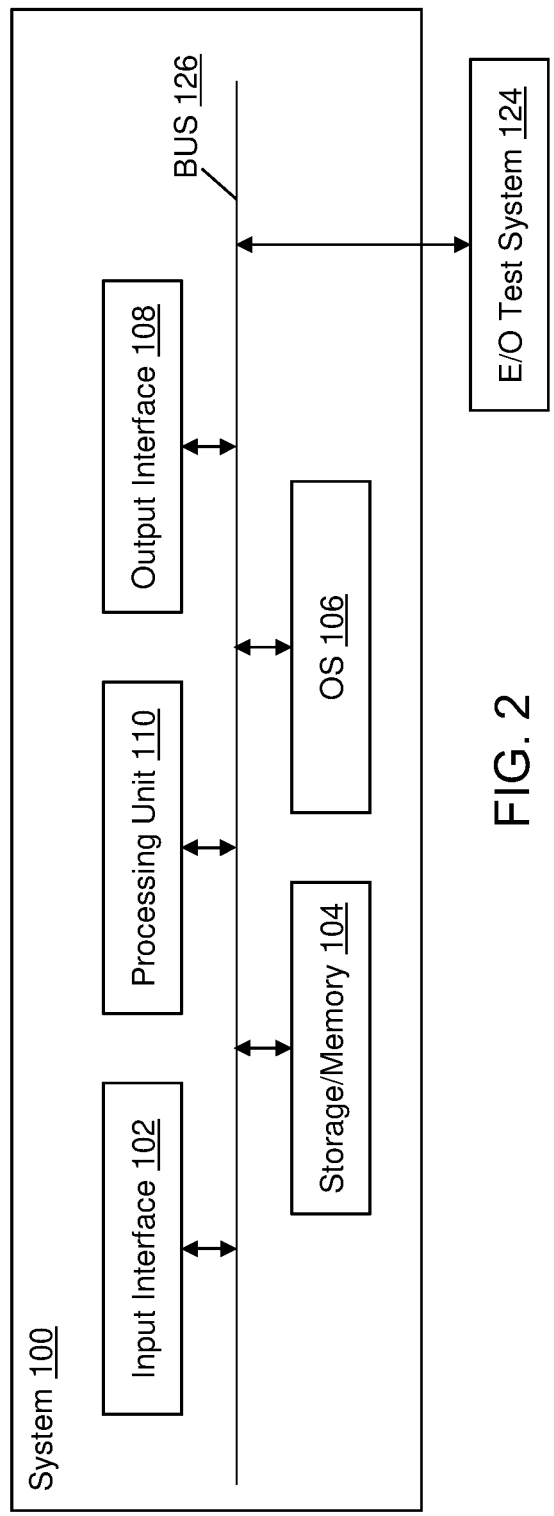
FIG. 2 is an exemplary block diagram of the architecture of a system embodying the invention.

Referring now to the drawings, FIG. 2 illustrates schematic block diagram of a system, generally designated 100, according to embodiments of the present disclosure. In general terms, the system 100 includes an input interface 102, a storage/memory 104, an operating system (OS) 106, an output interface 108, and an image processing unit, referred to hereinafter interchangeably as processing unit 110.

The input interface 102 functions to receive input and provide that received input to the processing unit 110. Some of the inputs received by the input interface 102 can be image parameters, including, for example, the desired resolution at which objects of interest will be rendered by the processing unit 110, as well as the particular object or objects of interest to be rendered—which can be selected by a user of the system 100.

Generally speaking, a selected object of interest (OOI) that is to be rendered at the desired resolution defines a high-resolution bounding region within the scene image. This high-resolution bounding region is a 2D rectangular region and is also referred to hereafter interchangeably as a "bounding box"). The bounding box is generally defined as the region that bounds (preferably tightly bounds) the OOI such that the OOI is positioned/located (preferably tightly fitted) within the bounding box, and can be calculated according to scene/virtual camera parameters and the desired resolution (e.g., number of meters per pixel) as was defined for system 100 and the OOI dimensions (as input by the user of the system 100).

Other inputs received by the input interface 102 can include data objects, including image data and data/parameters associated with image data including, for example, object geometry parameters of the elements of the scene to be imaged, including the 3D geometries of different objects of the scene, including foreground objects, background objects, and objects of interest. The input parameters are typically provided to the input interface 102 by a user of the system 100. It is noted that a user of the system 100 may first provide the processing unit 110 with 3D models of all of the participating objects in the scene that is to be simulated using the system 100, including the OOI, background objects, foreground objects, and a 3D model of the view of the simulated camera itself. In certain embodiments, the user of the system 100 may use the system 100 itself to generate the 3D models as data objects, using modeling tools or software that are executed by the processing unit 110. In other embodiments, the user of the system 100 may employ 3D modeling tools or software on a standalone computer system to generate the 3D models as data objects that can be input into the processing unit 110.

The input interface 102 can include one or more computing device inputs that can receive input from a user and provide the received input to other computing components of the system 100, including the processing unit 110. Examples of device inputs include, but are not limited to, a keyboard, a mouse, and a microphone. In certain non-limiting implementations, the input interface 102 can include a graphical user interface (GUI) that is displayed on a display device (not shown) connected to the system 100.

The storage/memory 104 can be any conventional storage media, which although shown as a single component for representative purposes, may be multiple components. The storage/memory 104 can be implemented in various ways, including, for example, one or more volatile or non-volatile memory, a flash memory, a read-only memory, a random-access memory, and the like. The storage/memory 104 preferably stores machine executable instructions for execution by the processing unit 110, to perform the processes of the present embodiments. The storage/memory 104 also includes machine executable instructions associated with the operation of the components, including the processing unit 110, and all instructions for executing the processes of FIG. 6, detailed herein.

The OS 106 can include any of the conventional computer operating systems, such as those available from Microsoft of Redmond Washington, commercially available as Windows® OS, such as Windows® 10, Windows® 7, Apple of Cupertino, CA, commercially available as MAC OS, or iOS, open-source software based operating systems, such as Android, and the like. In certain embodiments, the OS 106 is implemented as a real-time operating system (RTOS), such as VxWorks or pSOS available from Wind River of Alameda, CA, VRTX available from Mentor Graphics Wilsonville, OR, and RTLinux developed by FSMLabs (of Austin, TX) and Wind River, which allows the system 100 to execute the processes of the present embodiments in real-time.

The output interface 108 functions to receive input from one or more other components of the system 100, and provide those received inputs as output from the system 100. As will be discussed in further detail below, the output interface 108 is particularly configured to receive processed data—in the form of one or more processed output images—from the processing unit 110, and provide those one or more output images as system output, which can be provided as input to components that are external to the system 100.

The processing unit 110 can most preferably be implemented as one or more graphics processing units (GPUs), and is formed from one or more computer processors, including for example microprocessors, image processors, graphics processors, digital signal processors, and the like and/or combinations thereof. The computer processors of the processing unit 110 are configured for executing the functionalities and operations of the system 100, including the processes shown and described in the diagrams of FIGS. 5 and 6.

All components of the system 100 are connected or linked to each other, either directly or indirectly, via a data communication connection or an electronic connection, schematically represented in FIG. 2 as bus 126.

The system 100 is also connected/linked to an imaging device test system, represented in FIG. 2 as electro-optical (E/O) test system 124. As will be discussed, the output image data generated by the processing unit 110 can be used as input to the E/O test system 124 in order to test various aspects of imaging devices that are simulated using the system 100 of the present disclosure. Such aspects can include, for example, image processing algorithms used by imaging devices.

Figure 3:
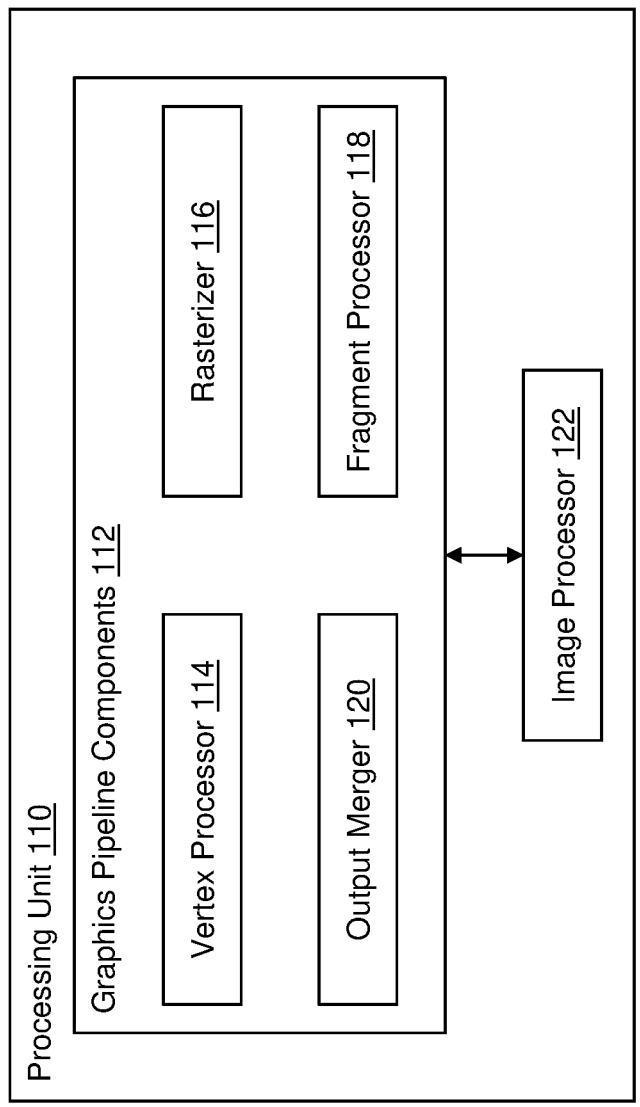
FIG. 3 is a block diagram of a processing unit of the system of FIG. 2.

With continued reference to FIG. 2, refer now to FIG. 3 detailing subcomponents of the processing unit 110. In the illustrated non-limiting embodiment, the processing unit 110 includes components 112 for executing various stages of a graphics pipeline, such as the pipeline 12 illustrated in FIG. 1. In such embodiments, the components 112 include a vector processor 114 for executing the vector processing stage 14, a rasterizer 116 for executing the rasterization stage 16, a fragment processor 118 for executing the fragment processing stage 18, and an output merger 120 for executing the output merging stage 20.

The components that execute the graphics pipeline, including the vector processor 114, the rasterizer 116, the fragment processor 118, and the output merger 120, as well as any other sub-components thereof any other graphics pipeline components, can be implemented as computer modules, which can be implemented as hardware modules or software modules, and include software, software routines, code, code segments and the like, embodied, for example, in computer components, modules and the like, that are installed as part of the processing unit 110. In preferred embodiments, the components 112 are implemented as a state-machine using software or firmware modules, whereby the states of the various objects of the scene, including foreground objects, background objects, and objects of interest, can be toggled in response to user input via the input interface 102, thereby changing various parameters associated with the aforesaid objects. All of the components 112 of the graphics pipeline components 112, including the vector processor 114, the rasterizer 116, the fragment processor 118, and the output merger 120, as well as any other graphics pipeline components not explicitly illustrated herein, are connected or linked to each other, either directly or indirectly, for example via a logical connection (for example when implemented as software/firmware) or via a data communication connection such as a data bus.

The processing unit 110 further includes an image processor 122 linked to the components 112. The image processor 122 can be implemented as a computer module, which can be implemented as a hardware module or software module, and includes software, software routines, code, code segments and the like, embodied, for example, in computer components, modules and the like, that are installed on the processing unit 110. It is noted that the image processor 122, although illustrated as being separate from the components 112, can in certain implementations operate within the context of the components 112, such that certain elements of the components 112 perform some of the functions of the image processor 122. In certain embodiments, the image processor 122 can be programmed to execute tasks according to the graphics pipeline, whereby the graphics pipeline components 112 can be implemented as software or firmware modules that are executed by the image processor 122.

The processing unit 110 generally functions as a virtual camera system that produces rendered image data corresponding to a scene, where each scene contains one or more objects of interest positioned relative to all other scene objects that can include one or more additional objects. The objects in the scene have three-dimensional (3D) geometries (corresponding to the 3D models provided as input to the processing unit 110) which are projected onto a 2D image plane as a result of processing by the graphics pipeline components 112 and the image processor 122.

Figure 4:
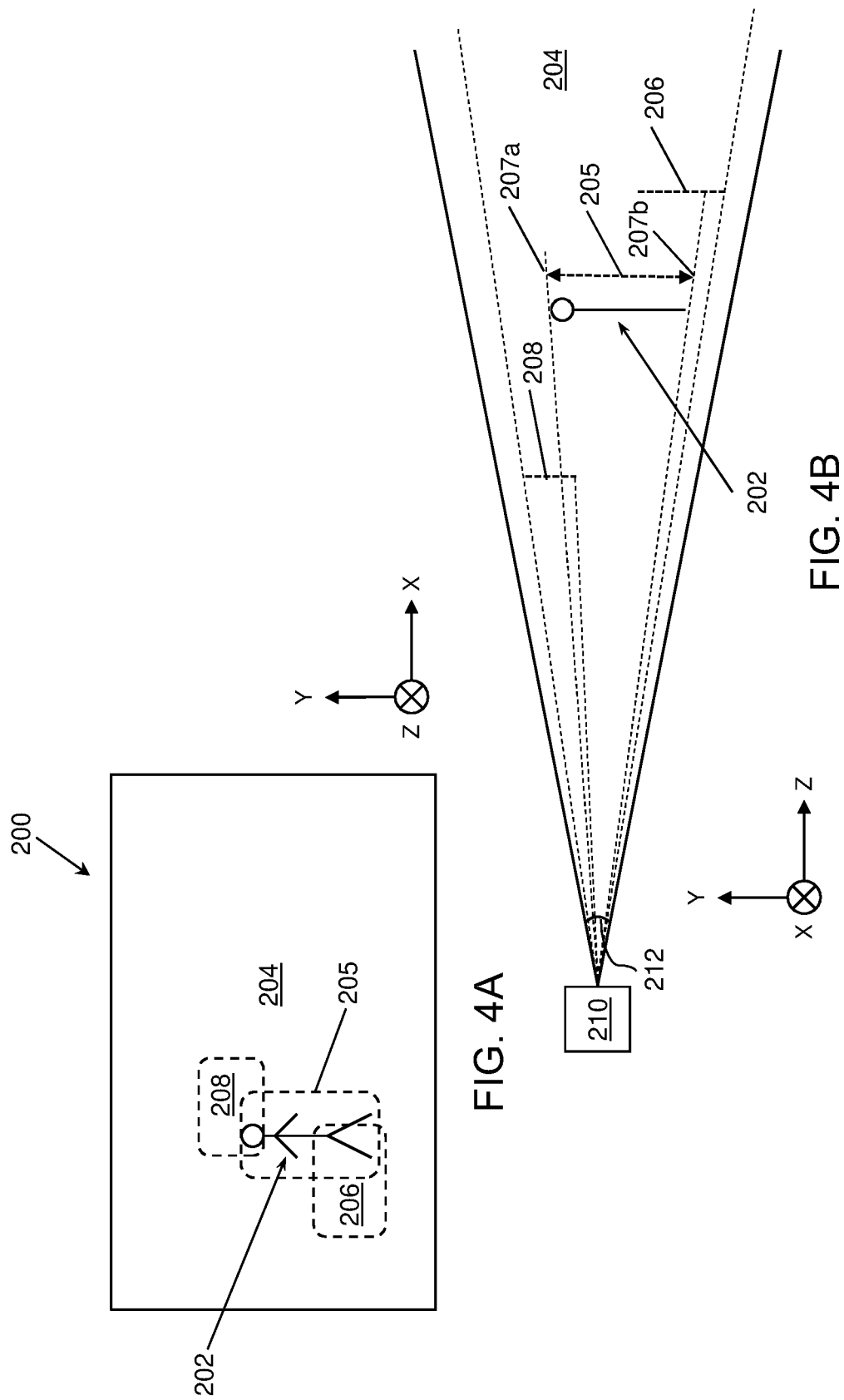
FIG. 4A is a schematic front view of a scene containing an object of interest, from the point of view of a virtual camera that is simulated by the processing unit of FIG. 3.
FIG. 4B is a schematic side view of the scene of FIG. 4A, additionally showing a virtual camera.

FIG. 4A illustrates a schematic front view of an exemplary scene 200 containing an object of interest (OOI) 202 and one or more additional objects, schematically represented as rounded rectangles 206, 208. The scene 200 can be simulated using the system 100 according to embodiments of the present disclosure by building up a simulated image of the scene. In the scene to be simulated, the OOI 202 is positioned against a background 204 that typically comprises one or more objects, which in the present example includes background object 206, but which may include additional background objects. The scene 200 as illustrated in FIG. 4A is taken from the point of view of the virtual camera, where the virtual camera is positioned at some distance from the scene 200 along an axis (illustrated arbitrarily here as corresponding to the "z-axis"). The OOI 202 defines the bounding box, designated 205 (as mentioned, for example, as calculated by the system 100 according to scene/virtual camera parameters and a desired resolution selected by a user via the input interface 102), and is the area or region within the scene that bounds the OOI for which the resolution will be enhanced by the image processor 122. In FIG. 4A, at least one of the background objects is also within the bounding box 205, and one or more foreground objects may also be within the bounding box 205. Without loss of generality, in the present example illustrated in FIG. 4A, at least part of object 206 falls within the bounding box 205, but additional background objects that are not illustrated in the drawings may also be within the bounding box 205.

FIG. 4B is a schematic side view of the same scene 200 illustrated in FIG. 4A, additionally showing the virtual camera 210 and the locations of various objects in the scene 200, which is within the field of view (FOV) 212 of the virtual camera 210. (The FOV 212 is represented here as a vertical FOV, but it should be apparent that the FOV can include a horizontal FOV component such that the two-dimensional FOV is a pyramid). In this particular example, the scene 200 includes the OOI 202 and two additional objects 206, 208. In three-dimensional space, the object 208 is a "foreground object" or "near object" that is positioned between the virtual camera 210 and the OOI 202 such that the near object 208 at least partially obstructs the OOI 202 (from the point of view of the virtual camera 210). The various dotted lines in FIG. 4B represent the extreme points of the various scene objects in the vertical dimension of the FOV. For example, the bounding box 205 is shown here as a vertical segment that is bounded by dotted lines 207a and 207b, which respectively represent the upper and lower extreme points of the high-resolution segment of the FOV (the bounding box 205) within which the object 202 is located. Although not illustrated in the drawings, additional foreground objects may also be present. Such additional foreground objects may or may not partially or fully obstruct the OOI 202. In three-dimensional space, the object 206 is a background object or "far object" that is beyond the OOI 202 (i.e., the OOI 202 is positioned between the virtual camera 210 and the far object 206 such that the OOI 202 at least partially obstructs the far object 206). Although the illustrated scenario shows the object 202 as the OOI positioned between foreground object 208 and background object 206, it is noted that if the near object 208 were taken as the OOI, the objects 202 and 206 would be background objects that are part of the background 204. Furthermore, if the object 206 were taken as the OOI, the objects 202 and 208 would be foreground objects.

The image processor 122 is configured to receive sets of images, and to process the images in order to generate one or more output images corresponding to a scene that contains one or more objects of interest deployed within the scene, in which a particular one of the objects of interest is rendered at a corresponding desired resolution that is increased with respect to the scene image in accordance with one or more input parameters provided to the processing unit 110 via the input interface 102. In certain non-limiting implementations, the image processor 122 receives such images as input from the components 112. As will be discussed, the desired resolution of OOI is kept fixed within the bounding box, regardless the OOI position or distance, and therefore this desired resolution can be referred to as "fixed object resolution".

Generally speaking, in order to render an image of the scene with the OOI rendered at an increased (i.e., "higher") resolution, the image processor 122 receives as input a plurality of sets of images (for example, from the graphics pipeline, i.e., the components 112). The image processor 122 then processes the sets of images to generate an output image having the OOI at a higher (finer) resolution than the resolution of the scene. The output image is the image that is generated by the processing unit 110 (in particular the image processor 122) from processing the sets of images (plurality of images).

Parenthetically, each image discussed herein has associated image data, that includes pixel data containing pixel values for the image pixels, and may also have associated metadata containing parameters and information associated with the image (such as the position of the OOI within a standard scene image). All of the aforementioned images are data objects that can be manipulated and transformed by computer processors, such as the image processor 122 and the components 112, and carry information descriptive of an image including at least pixel data.

The operations performed by the image processor 122 will now be described in more detail. The image processor 122 is configured to receive images as input and process the images to generate an output image. In certain embodiments the image processor 122 pre-processes the images to generate four images that are input to the module or computer component of the image processor 122 that performs the scene imaging simulation algorithm, or SISA, (described in the diagrams of FIGS. 5 and 6). In certain preferred embodiments, the graphics pipeline components 112 provides the four images that are input to the module or computer component of the image processor 122 that performs the SISA, such that the image processor 122 does not need to pre-process any received images.

The four images which are input to the SISA are 2D images that are rendered by the processing unit 110 in the 2D plane based on 3D geometry information in corresponding 3D models. The four images include:

1) A first image (also referred to as a "base scene image" or "base image") that is at a first resolution, which is an image of the scene (e.g., scene 200 in FIGS. 4A and 4B) that includes all objects (e.g., foreground object 208 and background object 206), but excludes any reference to the OOI (e.g., object 202). The OOI has no impact on the base image.

2) A second image (also referred to as an "enhanced object image" or "EOI") at a second resolution that is higher than the first resolution, which is an image of the bounding box, and in particular includes the OOI (e.g., object 202) within the image of the bounding box.

3) A third image (also referred to as an "enhanced bounding box image" or "EBBI") at the second resolution and in the same dimensions of the EOI, which is also an image of the bounding box, but the contents of the EBBI are different from the contents of the EOI. In particular, the EBBI represents the area/region in the scene where the OOI is to be incorporated, and includes all scene objects within this area, but in which the values of pixels in the image that correspond to the OOI are reduced accordingly such that the contribution of the OOI to the other objects in the bounding box is reduced, but the OOI still at least partially affects the other objects in the bounding box, as will be later explained.

4) A fourth image (also referred to as a "mask image" or simply "mask") at the second resolution, that is in dimensions of the EOI and the EBBI, wherein each pixel of the mask image has a value that represents the degree or level of the OOI contribution to that pixel in the ultimately generated output image. In other words, the pixel value of each pixel is indicative of the degree to which the OOI is present or absent/concealed in that pixel. As will be discussed, the contribution of the OOI may be due to the location of the OOI, and/or the degree of transparency or opacity of OOI relative to background objects, and/or the degree of transparency or opacity of foreground objects relative to the OOI.

From the description above, the EOI, EBBI, and mask are all at the same resolution (i.e., the second resolution), which is higher than the resolution (i.e., the first resolution) of the base image. The second resolution is preferably provided to the image processor 122 as input via the input interface 102, and can be one of the above-mentioned input parameters.

The first resolution, which is the resolution of the base image, can be considered to be a "standard" or "nominal" resolution from the perspective of the graphics pipeline. In other words, the first resolution is the resolution at which the graphics pipeline renders the base image.

The image processor 122 can, in certain embodiments, receive one or more full images of the scene, which includes all objects (e.g., the OOI 202, and objects 206, 208), and pre-process the image or images in various ways to generate the base image, EOI, and EBBI. In other more preferable embodiments, the components 112 perform various processing steps to generate the base image, EOI, and EBBI, and then provide the base image, EOI, and EBBI to the image processor 122. The following paragraphs describe the contents of the four images in greater detail, as well as some of the pre-processing that can be applied to generate the four images. In the following paragraphs, the pre-processing is described as being performed by the graphics pipeline components 112 so as to generate one or more of the four images, such that the image processor 122 does not need to pre-process the image input received from the graphics pipeline components 112.

As mentioned above, the base image is an image of the scene (at the first resolution), and includes all scene objects except for the OOI. In certain embodiments, the state of the graphics pipeline components 112 is toggled in response to the selection of the object of interest so as to remove the OOI from a full image of the scene (that includes all scene objects including the OOI) in order to generate the base image, resulting in an image having the full scene and excluding the OOI.

The EOI is an image of the bounding box (e.g., the area designated 205 in FIGS. 4A and 4B), which is a region of the scene that bounds the OOI. This region may also include one or more background objects and/or one or more foreground objects. In the EOI, preferably only the OOI is present (i.e., the EOI preferably excludes any and all portions of any background objects and any and all portions of any foreground objects). In other words, the EOI is an image that preferably does not include any image data corresponding to other objects in the scene besides the OOI, and in which the pixel density of the OOI is larger than the pixel density of the base image.

In certain preferred embodiments, the EOI is obtained from the graphics pipeline components 112, which toggles the state of the graphics pipeline components 112 to a particular state in response to the selection of the OOI. The particular state corresponds to the state in which the graphics pipeline components 112 removes contributions of objects that are not the OOI from the bounding box, and renders the remaining object within the bounding box at a higher density compared to the density at which the base image was rendered. As a result, the EOI excludes image data corresponding to objects in the scene that are not the OOI at a higher pixel density compared to the base image (which is at a lower pixel density).

Within the context of this document, the term "pixel density" generally refers to the number of pixels used to subdivide the solid angle or FOV corresponding to an image. For example, the FOV 212 in FIG. 4B can be subdivided into N equal segments such that the image is represented by N pixels (in the vertical dimension) where each pixel is a slice of the solid angle. A sub-section of the FOV 212, for example a sub-section corresponding to the bounding box that contains the object of interest (e.g., region designated 205), can then be further subdivided into M segments, such that the objects in the window are sampled by M pixels.

Note that the resolution of the OOI relative to the full scene image is fixed in the generation of the EOI, such that the calculation of the pixels of the OOI is independent of the distance between the OOI and the virtual camera.

The EBBI is an image at the same resolution as the EOI, and is an image of the same region of the scene as the EOI (i.e., the EBBI is also an image of the bounding box), but in which the contribution of the OOI on other objects in the bounding box is reduced. Despite the contribution reduction, the OOI still at least partially affects one or more other objects in the bounding box. In order to reduce the contribution of the OOI on the other objects in the bounding box, the values of pixels in the EBBI that correspond to the OOI are reduced comparatively to the values of corresponding pixels in the EOI. The other objects that can be in the EBBI can include background objects in the bounding box that are at least partially obstructed/concealed by the OOI, background objects in the bounding box that are unobstructed by the OOI, as well as any foreground objects in the bounding box which may or may not at least partially obstruct the OOI. The OOI, as well as each of the aforementioned background objects and foreground objects may have associated levels of transparency or opacity, as will be discussed. In the non-limiting example illustrated in FIG. 4B, the EBBI for the bounding box 205 includes portions of the background object 206 that are obstructed by the OOI 202, as well as a small portion of the foreground object 208 that obstructs the upper (in the positive Y direction) portion of the object of interest 202.

The EBBI can be obtained from the graphics pipeline components 112, which toggles the state of the graphics pipeline components 112 to a particular state in response to the selection of the object of interest. The particular state corresponds to the state in which the graphics pipeline components 112 reduces the contribution of the OOI from the bounding box (and in certain instances removes the OOI altogether from the bounding box), and samples the remaining objects and portions thereof within the bounding box at a higher sampling density compared to the sampling density at which the base image was sampled. As a result, the EBBI includes the OOI at a reduced level of contribution compared to other objects in the bounding box (or altogether excludes the OOI), and has a higher pixel density compared to the base image.

It is noted that the enhanced object image and the enhanced background image can be thought of complementary images, whereby the two images are images of the same region (the bounding box) but in which one of the images (the EOI) includes the full contribution of the OOI and preferably excludes all other objects, and the other image (the EBBI) includes all objects in the bounding box with impact/contribution of the OOI reduced.

The mask image is also an image of the bounding box, and is at the same resolution as the EOI and the EBBI. In the mask image, the value of each pixel holds a value that represents the degree of the contribution of the OOI to that pixel. It is generally convenient to use normalized pixel values (i.e., pixel values that take on values between 0 and 1 inclusive) for the mask image, whereby the closer a pixel value is to 0 the less the contribution of the OOI to that pixel, and the closer a pixel value is to 1 the higher the contribution of the OOI to that pixel. The normalized pixel values can be obtained by dividing each integer pixel value by the maximum achievable pixel value, e.g., 255 for 8-bit pixel values. In general, for each pixel of the mask image, the level of contribution of the OOI to that pixel can be: 1) no contribution, i.e., a pixel value of 0, 2) full contribution, i.e., a pixel value of 1, or 3) partial contribution, i.e., a pixel value somewhere between 0 and 1.

The OOI may have no contribution to a given pixel if the OOI is not present in that pixel, or if the portion of the OOI corresponding to that pixel is fully obstructed (hidden) by another object (e.g., part of a foreground object fully obstructs the portion of the OOI).

The OOI may have a partial contribution to a given pixel in two situations. In a first situation, the pixel corresponds (represents) a portion of the OOI that is at least partially transparent such that portions of one or more underlying objects are at least partially visible through the portion of the OOI. Here, the pixel value is a relative combination of the portion of the OOI and any underlying objects (background objects) behind the portion of the OOI. This would be the case for example in FIGS. 4A and 4B if portions of the OOI 202 that obstruct the object 206 were to be partially transparent such that portions of the object 206 within the bounding box 205 were visible through the OOI 202. In a second situation, the pixel corresponds to a portion of a foreground object that is partially transparent, such that the corresponding portion of the OOI is at least partially visible through the partially transparent portion of the foreground object. This would be the case for example in FIGS. 4A and 4B if portions of the object 208 that obstruct the OOI 202 were to be partially transparent such that one or more portions of the OOI 202 were visible through the object 208.

In certain embodiments, the image processor 122 generates the mask image based in part on the EOI and the EBBI. In other preferred embodiments, the graphics pipeline components 112 generate the mask image based in part on the EOI and the EBBI, and provide the mask image to the image processor 122. In order to generate the mask image, a full rendered image of the scene at the enhanced resolution (i.e., the "second resolution") can be utilized by the image processor 122 or components 112.

The following paragraphs provide an example of how the mask image can be generated using the full rendered image, the EOI, and the EBBI, specifically the case of having more than one OOI in the scene. The example is provided using the example case illustrated in FIGS. 4A and 4B, and in particular in which the objects 206, 208 are also objects of interest (and not just background and foreground objects as previously described) which at least partially fall within the bounding box. Bearing this in mind, it is first noted that the full rendered image, which can be obtained by the image processor 122 from the components 112, is an image in which the radiance of all the other objects of interest in the scene that are not the current OOI is reset. In other words, if the current OOI is the object 202, then the full rendered image is an image in which the radiance of the far object 206 (which in the present context is also an object of interest) and the radiance of the near object 208 (which in the present context is also an object of interest) are reset. The full rendered image (referred to as $P_{tot}$) can be expressed by the following equation:

$$P_{tot}(I_{i \neq current\,OOI} = 0) = \qquad (1)$$
$$[I_{far}(1 - \alpha_{far})\alpha_{OOI} + I_{OOI}(1 - \alpha_{OOI})]\alpha_{near} + I_{near}(1 - \alpha_{near})$$

In the above equation, $I_{far}$ and $a_{far}$ are the respective per pixel radiance value and per pixel transparency level of the background object (e.g., object 206 or the background itself if there are no background objects), $I_{OOI}$ and $a_{OOI}$ are the respective per pixel radiance value and per pixel transparency level of the object of interest (e.g., object 202), and $I_{near}$ and $a_{near}$ are the respective per pixel radiance value and per pixel transparency level of the foreground object (e.g., object 208).

For each OOI, the EBBI can be expressed by the following equation:

$$P_{EBI}(I_{i \neq OOI} = 0) = I_{far}(1 - \alpha_{far})\alpha_{OOI}\alpha_{near} + I_{near}(1 - \alpha_{near}) \qquad (2)$$

Equation (1) can be expanded, and equation (2) can be substituted into expanded equation 1, yielding the following:

$$P_{tot}(I_{i \neq current\,OOI} = 0) = P_{EBI}(I_{i \neq OOI} = 0) + I_{OOI}(1 - \alpha_{OOI})\alpha_{near} \qquad (3)$$

For each OOI, the EBBI can be expressed by the following equation:

$$P_{EOI} = I_{OOI}(1 - \alpha_{OOI}) \qquad (4)$$

Substituting equation (3) into equation (4) and solving for $a_{near}$ results in the following expression:

$$\alpha_{near} = \frac{P_{tot}(I_{i \neq current\,OOI} = 0) - P_{EBI}(I_{i \neq OOI} = 0)}{P_{EOI}} \qquad (5)$$

As discussed above, the pixel values of the mask image are indicative of the contribution level of the OOI, which is precisely the information that is conveyed by $a_{near}$. Thus, the mask image can be obtained from the full rendered image using the EOI and the EBBI, in effect by removing the EBBI from the full rendered image and then scaling/normalizing the result by the EOI.

It is noted that in preferred implementations of the present disclosure, the mask image is computed offline prior to execution of the SISA, and therefore is not necessarily computed as part of the execution steps of SISA. Nevertheless, for the sake of clarity of illustration and completeness, a formulation for the derivation of the mask image has been provided above.

Figure 5:
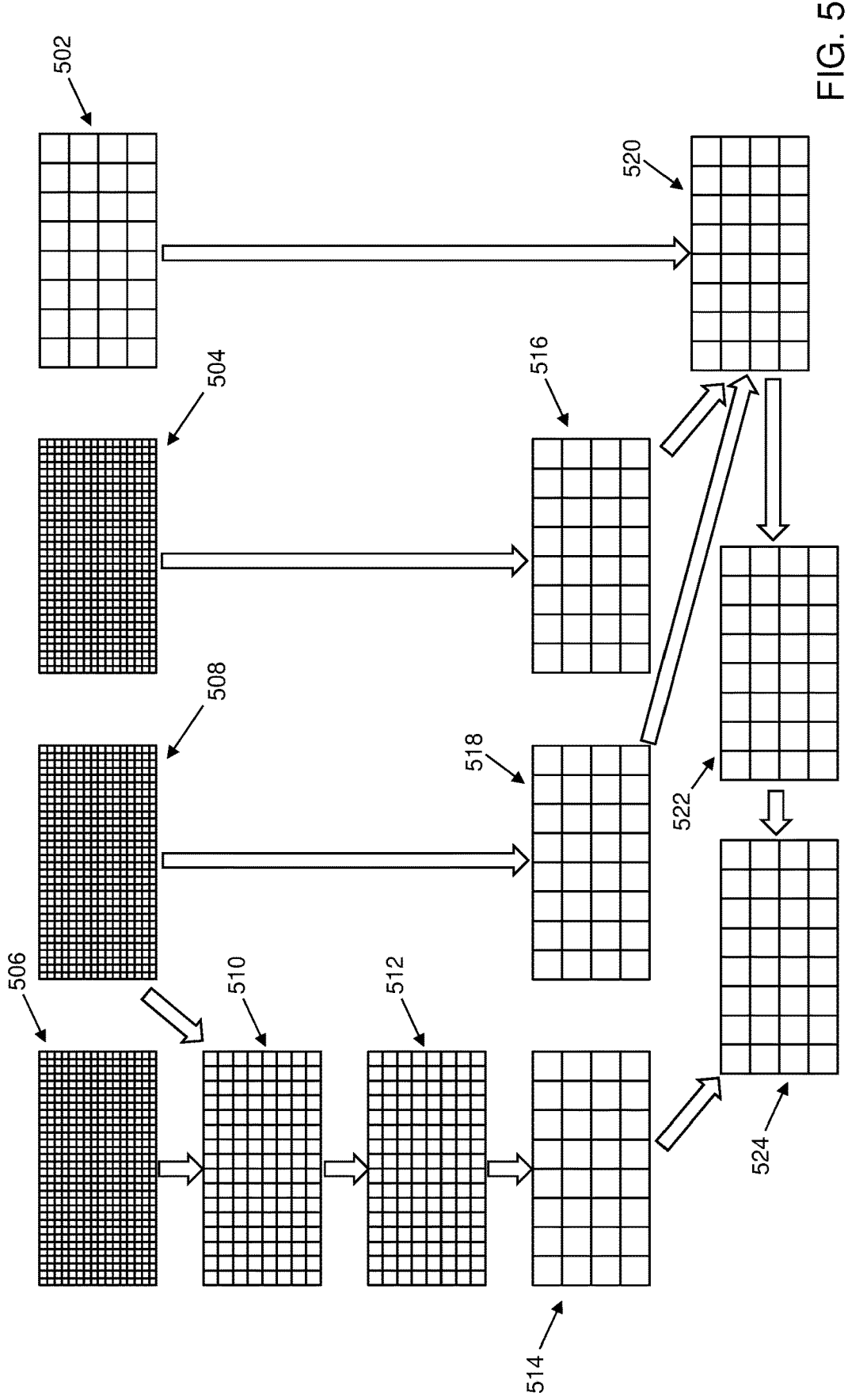
FIG. 5 is a schematically diagram illustrating an image processing flow performed by the processing unit of FIG. 3 according to embodiments of the present invention.

With continued reference to FIGS. 1-4B, refer now to FIG. 5, which schematically illustrates an image processing flow performed by the image processor 122 according to embodiments of the present disclosure in order to generate an enhanced resolution image of an OOI using the SISA. In FIG. 5, the thick arrows represent dependence between the various images. For each thick arrow, extension from a first image to a second image indicates that one or more properties or characteristics of the first image is used to produce or generate the second image.

In an exemplary series of processes to generate an enhanced resolution image of the OOI, the image processor 122 obtains the plurality of images, which includes the base image 502, the EOI 506, the EBBI 504, and the mask image 508. More specifically, the image processor 122 obtains one or more sets of images (and the image data and metadata associated therewith), and processes those images to generate an output image having the OOI at a higher resolution than the resolution of the scene.

To help more clearly demonstrate that the images 504, 506, 508 are at a second resolution which is higher than the first resolution of the image 502, FIG. 5 shows the images 504, 506, 508 as having a comparatively larger number of pixels (which for the purposes of illustration is shown schematically as small-sized squares) than the number of pixels (which for the purposes of illustration is shown schematically as large-sized squares) of the image 502.

The image processor 122 multiplies together the EOI 506 and the mask image 508 to produce a product image. Since the EOI 506 and the mask image 508 are both at the second resolution, the resolution of the resultant product image is also the second resolution. The image multiplication is performed element-wise, and can generally be performed pixel-by-pixel, where the pixel value of each pixel of the EOI 506 is multiplied by the normalized pixel value of the corresponding pixel of the mask image 508.

The image processor 122 then reduces the resolution of the product image to the first resolution (i.e., the resolution of the base image 502), thereby producing a reduced resolution product image 514. In preferred embodiments, the resolution reduction is performed in multiple stages. In a first stage, the image processor 122 downsamples the product image commensurate with an interim resolution that is between the first and second resolutions so as to produce a downsampled product image 510 at the interim resolution. Note that for simplicity of illustration, FIG. 5 illustrates a non-limiting implementation in which the multiplication of the images 506, 508 and downsampling are performed as a single step to produce the downsampled product image 510. Also note that for clarity of illustration, FIG. 5 shows the image 510 as having comparatively fewer number of pixels (which for the purposes of illustration is shown schematically as medium-sized squares) than the number of pixels of the image 506, but also comparatively greater number of pixels than the number of pixels of the image 502.

In a second stage, the downsampled product image 510 is blurred using a blurring/smoothing function (also referred to as a point spread function), for example a Gaussian function, to produce a blurred-downsampled image 512. Practically, the image processor 122 blurs the downsampled product image by convolving the downsampled product image with the blurring/smoothing function. The downsampled product image is blurred in order to mimic the optics of the camera that is being simulated by the system 100. The blurring is performed at a resolution level that is determined in accordance with the image accuracy requested by the user of the system 100. In a third stage, the image processor 122 downsamples the blurred-downsampled image 512 commensurate with the first resolution so as to produce a blurred-downsampled product image 514 (at the first resolution), which is equivalent to the reduced resolution product image 514.

The image processor 122 reduces the resolution of the EBBI 504 from the second resolution to the first resolution by downsampling the EBBI 504 at a sampling rate commensurate with the first resolution so as to produce a downsampled EBBI 516 (also referred to as a reduced resolution EBBI). The image processor 122 also reduces the resolution of the mask image 508 from the second resolution to the first resolution by downsampling the mask image 508 commensurate with the first resolution so as to produce a downsampled mask image 518 (also referred to as a reduced resolution mask image).

Parenthetically, the image processor 122 can downsample the above-mentioned images by employing any suitable downsampling technique that preserves the energy in the image. This may include techniques that provide integer factor rate-reduction or ration factor rate-reduction. Such downsampling techniques are commonly known in the fields of image and signal processing.

The image processor 122 can apply various computing techniques to process the EBBI 504 and the mask image 508 to generate the downsampled EBBI 516 and the downsampled mask image 518. In certain embodiments, the image processor 122 performs the downsampling of the EBBI 504 and the mask image 508 using parallel processing techniques such that the downsampled EBBI 516 and the downsampled mask image 518 are generated in parallel. In other preferred embodiments, serial processing is performed in which the image processor 122 downsamples the EBBI or the mask image first, and then downsamples the mask image or the EBBI. In certain embodiments, the image processor 122 generates the reduced resolution EBBI and mask image after generating the blurred-downsampled product image. In other embodiments, the image processor 122 generates the reduced resolution EBBI and mask image prior to generating the blurred-downsampled product image. In yet further embodiments, the image processor 122 generates the reduced resolution EBBI and mask image while performing processes to generate the blurred-downsampled product image.

After the downsampled EBBI 516 and the downsampled mask image 518 are generated, the image processor 122 then combines together the reduced resolution product image 514 and an intermediate bounding box image (IOFI) 520 to produce a final output image 524. The IOFI 520 is a weighted combination of the base image 502 and the reduced resolution EBBI 516, in which the weights used in the weighted combination are based on the reduced resolution mask image 518. In a non-limiting implementation, the image processor 122 generates the IOFI 520 by applying weights to the elements (pixels) of the base image 502 (based on the reduced resolution mask image 518), and by applying weights to the elements (pixels) of the reduced resolution EBBI 516 (based on the reduced resolution mask image 518), and then combining (element-by-element adding) the resulting weighted base image 502 and the resultant weighted reduced resolution EBBI 516. In particular, for each pixel of the base image 502, the image processor 122 can apply a weight to the pixel value in accordance with the normalized pixel values of the corresponding pixel of the reduced resolution mask image 518, by multiplying the pixel value of the base image 502 by the complement of (one minus) the normalized pixel value the reduced resolution mask image 518. For each pixel of the reduced resolution EBBI 516, the image processor 122 can apply a weight to the pixel value in accordance with the normalized pixel values of the corresponding pixel of the reduced resolution mask image 518, by multiplying the pixel value of the reduced resolution EBBI 516 by the normalized pixel value the reduced resolution mask image 518. The image processor 122 can then combine the weighted pixel values of the base image 502 and the weighted pixel values of the reduced resolution EBBI 516 (element-by-element) to produce the IOFI 520.

The IOFI 520 is also blurred using a point spread function, e.g., a Gaussian function, to produce a blurred IOFI 522. The point spread function used to produce the blurred IOFI 522 can be the same type of function used to produce the blurred-downsampled image 512 discussed above, or another type of function. It is noted that the point spread function used to generate the blurred IOFI 522 is at a different resolution level from the function used to produce the blurred-downsampled image 512 such that the blurred IOFI 522 is at the same resolution as the background image 502.

The blurred IOFI 522 and the reduced resolution product image 514 are then added together, i.e., for each pixel the image processor 122 adds together the pixel value of the blurred IOFI 522 and the reduced resolution product image 514 to produce the final output image 524. Note that in practice the process steps of generating the IOFI and blurring the IOFI to produce the blurred IOFI can be combined as a single step.

Figure 6:
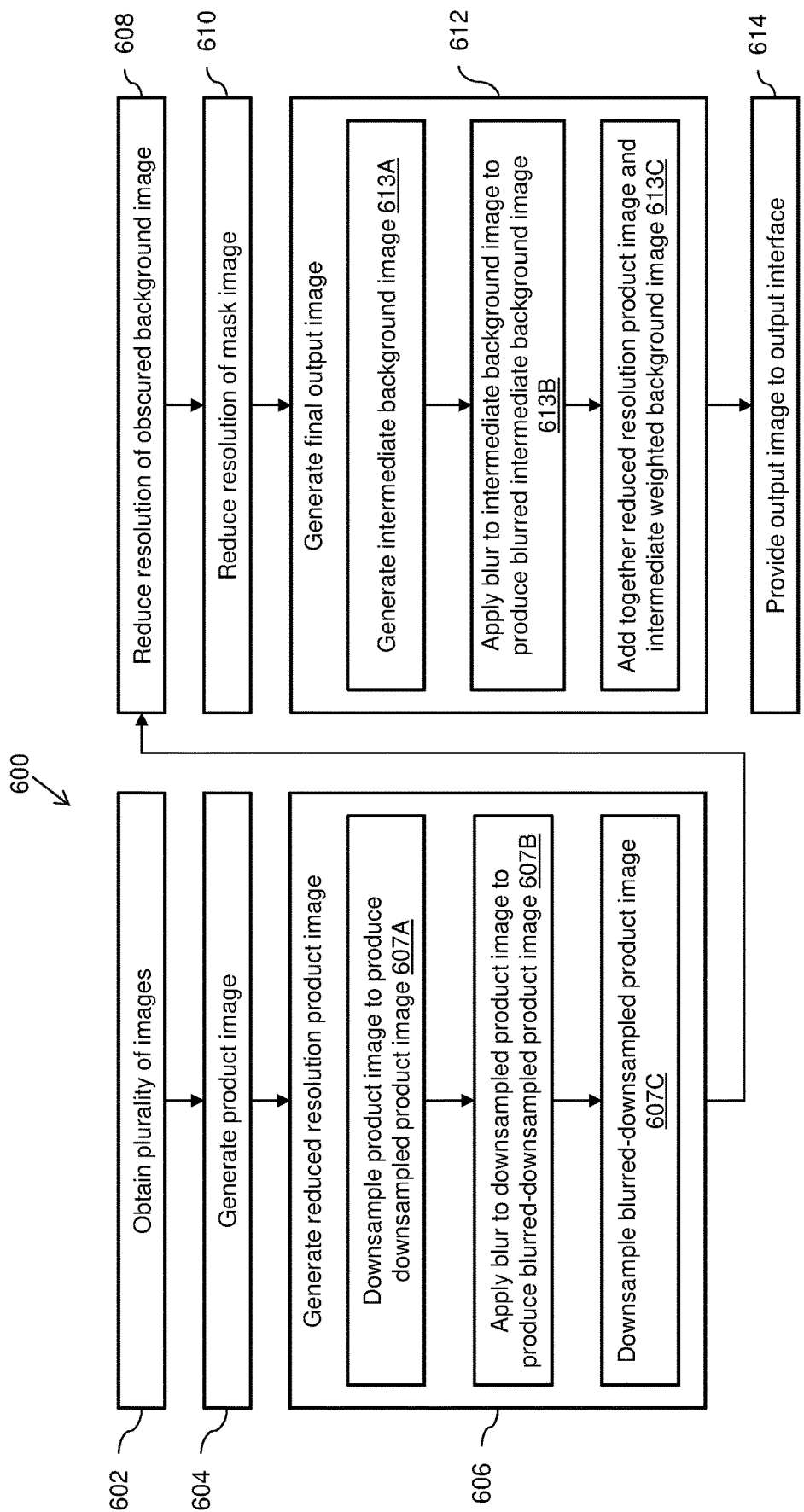
FIG. 6 is a flow diagram illustrating a process for enhancing the resolution of an object of interest according to embodiments of the present disclosure.

Attention is now directed to FIG. 6, which shows a flow diagram detailing a computer-implemented process 600 in accordance with embodiments of the disclosed subject matter. This computer-implemented process includes an algorithm for enhancing the resolution of an object of interest having three-dimensional (3D) geometries in a simulated scene. Reference is also made to FIGS. 1-5. The process and sub-processes of FIG. 6 are computerized processes performed by the system 100 including, for example, the processing unit 110, including the components 112 and in particular the image processor 122. The aforementioned processes and sub-processes are for example, performed automatically, but can be, for example, performed manually, and are performed, for example, in real-time.

The process 600 begins at step 602, where the image processor 122 obtains a plurality of images (having associated image data and metadata), including the base image 502, the EBBI 504, the EOI 506, and the mask image 508. The step of obtaining these images can include multiple sub-steps, including, for example, i) one or more sub-steps that include processing the EOI and the EBBI to generate the mask image in response to user input (e.g., input of 3D models of scene objects, selection of one of the scene objects as the OOI, etc.), and/or ii) one or more sub-steps that include pre-processing one or more images using the graphics pipeline or received from the graphics pipeline to generate the base image, the EBBI, and the EOI. In certain preferred embodiments, the graphics pipeline provides the base image, and/or the EBBI, and/or the EOI to the image processor 122 in response to user input (e.g., input of 3D models of scene objects, selection of one of the scene objects as the OOI, etc.), such that the image processor 122 does not need to perform any pre-processing on images to generate the provided one or more images.

The image processor 122 then co-processes the images obtained at step 602. The co-processing of the images is performed in steps 604-612.

At step 604, the image processor 122 processes the EOI 506 and the mask image 508 by element-wise multiplying together the EOI 506 and the mask image 508 to produce/generate a product image. The image processor 122 operates on image data at this processing step by, for example, multiplying corresponding pixel values in the EOI 506 and the mask image 508—as discussed above.

At step 606, the image processor 122 processes the product image to reduce the resolution of the product image from the second resolution to the first resolution, thereby producing a reduced resolution product image. As discussed above, the resolution reduction performed at step 606 is a multi-stage process, which includes sub-steps that include two-stage downsampling together with blur processing. The sub-steps of step 606 are illustrated as steps 607A-607C.

At sub-step 607A, the image processor 122 processes the product image by downsampling the product image to produce a downsampled product image 510 at an interim resolution between the first and second resolutions. Note that for simplicity of illustration, FIG. 5 illustrates a non-limiting implementation in which step 604 and sub-step 607A are combined as a single step (i.e., the multiplication of the images 506, 508 and downsampling are performed as a single step to produce the downsampled product image 510).

At sub-step 607B, the image processor 122 processes the downsampled product image 510 (produced at step 607A) by applying a blur kernel (using some point spread function) to the downsampled product image 510 to produce a blurred-downsampled image 512. At sub-step 607C, the image processor 122 processes the blurred-downsampled image 512 by downsampling the blurred-downsampled image 512 to produce the reduced resolution product image 514.

At step 608, the image processor 122 processes the EBBI 504 so as to reduce the resolution of the EBBI 504 from the second resolution to the first resolution. The processing at step 608 is performed by downsampling the EBBI 504, thereby producing a downsampled EBBI 516 (reduced resolution EBBI). At step 610 (which can be performed prior to, subsequent to, or in parallel with step 608), the image processor 122 processes the mask image 508 so as to reduce the resolution of the mask image 508 from the second resolution to the first resolution. The processing at step 610 is performed by downsampling the mask image 508, thereby producing a downsampled mask image 518 (reduced resolution mask image).

At step 612, the image processor 122 co-processes the images 502, 514, 516, 518 to generate/produce the final output image 524. The processing at step 612 includes combining together the reduced resolution product image 514 and a version of an intermediate bounding box image (IOFI). The final output image 524 generation performed at step 612 is a multi-stage process, which includes various sub-steps illustrated as steps 613A-613C.

At sub-step 613A, the image processor 122 co-processes the base image 502, the reduced resolution EBBI 516 (from step 608), and the reduced resolution mask image 518 (from step 610) to produce/generate the IOFI 520. The IOFI 520 is generated by applying weights to the base image 502 and to the reduced resolution EBBI 516 (from step 608) based on the values of the reduced resolution mask image 518 (from step 610). At sub-step 613B, the image processor 122 processes the IOFI 520 by applying a blur kernel to the IOFI 520 (using a point spread function) to produce a blurred IOFI 522. At sub-step 613C, the image processor 122 co-processes the blurred IOFI 522 and the reduced resolution product image 514 (step 606) to produce the final output image 524.

At step 614, the processing unit 110 provides the output image 524 (and all image data and metadata associated therewith) to the output interface 108 as a data object, which can be stored in one or more computer-readable storage media (memory). It is noted that the output interface 108 is not a display device for displaying the output image 524, but is rather a data interface that is configured as an interface that provides a data communication linkage between the system 100 and additional components, such as the E/O test system 124, which is/are external to the system 100.

In particularly preferred but non-limiting implementations, the processing steps described above with reference to FIGS. 5 and 6 are performed using at least two instantiations of the graphics pipeline. In a first pipeline instantiation, images at the first resolution are rendered (i.e., the background image 502 is rendered), and in a second pipeline instantiation, images at the second resolution are rendered (i.e., the EOI 506, the EBI 504, and the mask image 508 are rendered). This use of multiple pipeline instantiations can increase the speed at which the images are processed to produce the final output image 524, thereby increasing the efficacy of the SISA described herein. It is noted that the processing steps described above with reference to FIGS. 5 and 6 are performed for each particular object of interest in the scene. Thus, for a particular scene, a plurality of final output images can be generated, where each final output image includes a different object of interest at enhanced resolution. In the preferred but-non-limiting implementations in which two pipeline instantiations are used to generate an output image of a particular object of interest at enhanced resolution relative to a background at standard resolution, a plurality of sets of two pipeline instantiations can be used, where each set of two instantiation corresponds to a different object of interest.

It is noted that prior to execution of step 602, 3D models of the scene and the objects therein can be provided as input to the system 100. In addition, the OOI to be processed by the SISA is selected from the scene objects, and the image processing parameters (to be applied by the SISA) are selected, preferably by a user of the system 100. The selection of the OOI, as well as the image processing parameters, which include, for example, the sampling density and/or resolution of the selected OOI, is preferably provided as input to the processing unit 110 by a user of the system 100 via the input interface 102. For example, in non-limiting implementations in which the input interface 102 includes one or more computer input devices, such as, for example, a computer mouse and/or computer keyboard, the user of the system 100 may select an OOI and input rendering parameters, including the sampling density of the selected OOI and/or the desired "higher" resolution of the selected object of interest, using one or more of such computer input devices.

Furthermore, after the processing unit 110 has completed executing the process 600 for a given OOI, the processing unit 110 can re-execute the process 600 for a different selected OOI. For example, in a scene that includes multiple potential objects of interest (OOIs), the user of the system 100 may select one of the potential OOIs as the OOI, and the processing unit 110 can perform the SISA on the selected OOI by executing the steps of the process 600 to completion. The user of the system 100 may then select a different one of the potential OOIs as a new OOI, and the processing unit 110 can then perform the SISA on the new OOI by executing the steps of the process 600 to completion. This process may be repeated for each of the potential OOIs selected as the OOI by the user. In certain non-limiting implementations, the SISA can be performed on multiple selected OOIs in parallel by employing multiple parallel graphics pipeline instantiations and multiple parallel image processor 122 instantiations.

As briefly mentioned at the beginning of this document, the embodiments of the present disclosure provide several advantages over conventional rendering solutions. A non-exhaustive listing of some of those advantages provided by the system 100 are given below as follows:

1) Flexibility by enabling selectivity (by the user) of the desired spatial resolution of the object (or objects) of interest, such that object(s) of interest is/are sampled at a user-selected sampling density.

2) Reduced consumption of computational resources by only sampling selected object(s) of interest—which typically occupy a relatively small fraction of the entire image—at higher resolution instead of sampling the entire image at high resolution.

3) Preservation of image continuity by exploiting preservation of the scale of the object of interest relative to the entire image, such that enhancement of the object of interest is independent of the distance of the object from the virtual camera.

4) Reduced computational complexity by leveraging graphics pipeline components.

5) Handling multiple objects of interest by employing multiple graphics pipeline instantiations in parallel or serial.

As mentioned above, the system 100 according to embodiments of the present disclosure is ideally suited for use in imaging device development and test environments, in particular imaging processing algorithm development and test, whereby the output images generated by the system 100 can be provided to a development and test system, represented in the drawings as E/O test system 124. Imaging processing algorithm development for advanced electro-optical systems typically requires image simulations, generated using precise physical calculations, to be fed as input to the image processing algorithms. These input image simulations shorten algorithm development time, reduce experimentation, and produce a large number input test vectors, which enables fast attainment of high maturity E/O systems. The physical precision of the image simulations is paramount in reducing the algorithm development cycle and reaching high maturity systems quickly and efficiently. The system 100 according to the embodiments of the present disclosure allows for generation of images that replicate/duplicate/mimic actual physical objects as imaged by a camera/imaging device for a large number input test vectors, including, for example, types of objects of interest and/or foreground and/or background objects, sizes of objects of interest and/or foreground objects and/or background objects, different values for the standard ("first") resolution at which the background is imaged in the output image, different values for the enhanced/increased ("second") resolution at which the object of interest is imaged in the output image.

Although embodiments of the present disclosure have been described within the context of providing system output to E/O test system 124, the system 100 according to the embodiments described herein may also be used to advantage to provide generated images (each generated according to the process described in FIG. 6, i.e., each generated image being an output image 524) as input to a machine learning (ML) algorithm or neural network (NN)

for the purposes of training the ML algorithm or NN in order to, for example, classify real images captured by E/O devices (cameras). If the generated images used for training the ML algorithm or NN are realistic (i.e., accurately simulate images captured by a real camera), the ML algorithm or NN will be able to perform the ML algorithm or NN functions (e.g., image classification) with higher efficacy and accuracy.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for simulating image-capture of a scene by a camera, the scene containing at least one object of interest (OOI), the method comprising:
    a) obtaining a plurality of images each having an associated resolution, the plurality of images including:
        i) a first image, at a first resolution, that is an image of the scene and excludes the OOI,
        ii) a second image, at a second resolution higher than the first resolution, that is an image of the OOI,
        iii) a third image, at the second resolution, that is an image of a region that bounds the OOI, wherein the OOI at least partially affects one or more other objects in the region, and
        iv) a fourth image, at the second resolution, wherein for each pixel of the fourth image, a pixel value of the pixel indicates a contribution of the OOI in the pixel;
    b) multiplying together the second image and the fourth image to produce a product image;
    c) reducing the resolution of the product image to the first resolution to produce a reduced resolution product image;
    d) reducing the resolution of each of the third image and the fourth image to the first resolution to produce a reduced resolution third image and a reduced resolution fourth image; and
    e) combining together the reduced resolution product image and an intermediate image to produce an output image, the intermediate image being a weighted combination of the first image and the reduced resolution third image produced using weights based on the reduced resolution fourth image.

2. The method of claim 1, wherein reducing the resolution of the product image to the first resolution includes: downsampling and blurring the product image to produce a blurred-downsampled image at an interim resolution, and downsampling the blurred-downsampled image to the first resolution.

3. The method of claim 1, wherein the intermediate image is produced by: i) applying weights based on the reduced resolution fourth image to the first image to produce a weighted version of the first image, ii) applying weights based on the reduced resolution fourth image to the reduced resolution third image to produce a weighted version of the reduced resolution third image, and iii) adding together the weighted version first image and the weighted version of the reduced resolution third image to produce the weighted image.

4. The method of claim 1, wherein combining together the reduced resolution product image and the weighted image includes: adding the reduced resolution product image to the weighted image to produce the output image.

5. The method of claim 1, wherein the fourth image is generated based at least in part on each of the second image and the third image.

6. The method of claim 1, wherein the region includes one or more other objects in addition to the OOI.

7. The method of claim 6, wherein the second image excludes all of the one or more other objects.

8. The method of claim 1, wherein the second resolution is received as input from a user.

9. The method of claim 1, wherein the method is implemented on at least one processor using a graphics processing pipeline.

10. The method of claim 1, wherein the scene includes a plurality of OOIs, and wherein a) through e) are performed for each of the OOIs.

11. A system for simulating image-capture of a scene by a camera, the scene containing at least one object of interest (OOI), the system comprising:
    a) a processing unit including at least one processor in communication with at least one storage medium configured to:
        i) obtain a plurality of images each having an associated resolution, the plurality of images including:
            1) a first image, at a first resolution, that is an image of the scene and excludes the OOI, 2) a second image, at a second resolution higher than the first resolution, that is an image of the OOI,
3) a third image, at the second resolution, that is an image of a region that bounds the OOI, wherein the OOI at least partially affects one or more other objects in the region, and
4) a fourth image, at the second resolution, wherein for each pixel of the fourth image, a pixel value of the pixel indicates a contribution of the OOI in the pixel, ii) multiply together the second image and the fourth image to produce a product image,
iii) reduce the resolution of the product image to the first resolution to produce a reduced resolution product image,
iv) reduce the resolution of each of the third image and the fourth image to the first resolution to produce a reduced resolution third image and a reduced resolution fourth image, and
v) combine together the reduced resolution product image and an intermediate image to produce an output image, the intermediate image being a weighted combination of the first image and the reduced resolution third image produced using weights based on the reduced resolution fourth image.

12. The system of claim 11, wherein the processing unit is configured to reduce the resolution of the product image to the first resolution by downsampling and blurring the product image to produce a blurred-downsampled image at an interim resolution, and downsampling the blurred-downsampled image to the first resolution.

13. The system of claim 11, wherein the processing unit is configured to produce the intermediate image by: i) applying weights based on the reduced resolution fourth image to the first image to produce a weighted version of the first image, ii) applying weights based on the reduced resolution fourth image to the reduced resolution third image to produce a weighted version of the reduced resolution third image, and iii) adding together the weighted version first image and the weighted version of the reduced resolution third image to produce the weighted image.

14. The system of claim 11, wherein the processing unit is configured to combine together the reduced resolution product image and the weighted image by: adding the reduced resolution product image to the weighted image to produce the output image.

15. The system of claim 11, wherein the processing unit is further configured to generate the fourth image based at least in part on each of the second image and the third image.

16. The system of claim 11, wherein the region includes one or more other objects in addition to the OOI.

17. The system of claim 16, wherein the second image excludes all of the one or more other objects.

18. The system of claim 11, wherein the processing unit is further configured to receive the second resolution as input from a user.

19. The system of claim 11, further comprising:
b) an input interface in communication with the processing unit for providing at least the second resolution as input to the processing unit; and
c) an output interface in communication with the processing unit for providing at least the output image as output from the system.

20. The system of claim 11, wherein the processing unit is configured as a graphical processing unit that implements a graphics processing pipeline.

21. A computer usable non-transitory storage medium having a computer program embodied thereon for causing a suitably programmed system to produce an image thereby simulating image-capture of a scene by a camera, the scene containing at least one object of interest (OOI), by performing the following steps when such program is executed on the system, the steps comprising:
a) obtaining a plurality of images each having an associated resolution, the plurality of images including:
i) a first image, at a first resolution, that is an image of the scene and excludes the OOI,
ii) a second image, at a second resolution higher than the first resolution, that is an image of the OOI,
iii) a third image, at the second resolution, that is an image of a region that bounds the OOI, wherein the OOI at least partially affects one or more other objects in the region, and
iv) a fourth image, at the second resolution, wherein for each pixel of the fourth image, a pixel value of the pixel indicates a contribution of the OOI in the pixel;
b) multiplying together the second image and the fourth image to produce a product image;
c) reducing the resolution of the product image to the first resolution to produce a reduced resolution product image;
d) reducing the resolution of each of the third image and the fourth image to the first resolution to produce a reduced resolution third image and a reduced resolution fourth image; and
e) combining together the reduced resolution product image and an intermediate image to produce an output image, the intermediate image being a weighted combination of the first image and the reduced resolution third image produced using weights based on the reduced resolution fourth image.

* * * * *